United States Patent
Cartwright (10) Patent No.: US 11,680,843 B2
(45) Date of Patent: Jun. 20, 2023

(54) WEIGHING BALANCE

(71) Applicant: ILLINOIS TOOL WORKS INC., Glenview, IL (US)

(72) Inventor: Kevin R. Cartwright, Birmingham (GB)

(73) Assignee: ILLINOIS TOOL WORKS INC., Glenview, IL (US)

(*) Notice: Subject to any disclaimer, the term of this patent is extended or adjusted under 35 U.S.C. 154(b) by 412 days.

(21) Appl. No.: 16/872,738

(22) Filed: May 12, 2020

(65) Prior Publication Data
US 2020/0363257 A1    Nov. 19, 2020

(30) Foreign Application Priority Data

May 14, 2019 (GB) .................................... 1906763
Dec. 16, 2019 (GB) .................................... 1918487

(51) Int. Cl.
*G01G 19/34* (2006.01)
*A23L 5/00* (2016.01)
*G06F 3/16* (2006.01)

(52) U.S. Cl.
CPC .............. *G01G 19/346* (2013.01); *A23L 5/00* (2016.08); *G06F 3/167* (2013.01)

(58) Field of Classification Search
CPC .... G01G 19/346; G01G 23/365; G01G 19/40; G01G 19/414; G01G 19/4144; G01G 19/62; A23L 5/00; G06F 3/167; A23P 20/20; G06Q 50/12
See application file for complete search history.

(56) References Cited

U.S. PATENT DOCUMENTS

| 5,937,386 A * | 8/1999 | Frantz .................... G06Q 50/12 |
| | | 705/16 |
| 9,121,750 B2 | 9/2015 | Rode et al. |
| 2013/0101709 A1 | 4/2013 | Rader |
| 2018/0218219 A1 | 8/2018 | Kubotani |

FOREIGN PATENT DOCUMENTS

| EP | 2466279 A1 | 6/2012 |
| EP | 2972142 B1 | 6/2019 |
| JP | 2007003427 A | 1/2007 |
| WO | WO 2012112497 A2 | 8/2012 |
| WO | WO 2016140623 A1 | 9/2016 |

* cited by examiner

*Primary Examiner* — Rick K Chang
(74) *Attorney, Agent, or Firm* — Thompson Hine LLP (57) ABSTRACT

A control system for controlling the quantities of items of a product includes: a) a weighing scale; b) a memory storage device storing data of a target associated to the weight of at least one item; and c) a processor in communication with the weighing scale and the memory storage device. The processor is configured to output a sensory indicator corresponding to the weight of at least one of the items placed on the weighing scale. The sensory indicator provides a different sensory indication when the weight of at least one of item placed on the weighing scale is above, below or between the target.

14 Claims, 6 Drawing Sheets

WEIGHING BALANCE

FIELD OF INVENTION

The present invention relates to weighing balances, more specifically to controlling the quantities of items on a weighing balance.

INTRODUCTION

Controlling the quantities of ingredients in a product such as food products is essential in order to make sure that the product meets the required tolerances in terms of its physical properties such as weight, size, as well as chemical make-up of the food product and ultimately, the taste of the food product. In an industrial environment or in a laboratory, ingredients are typically prepared by accurately weighing each of the ingredients prior to being blended together, e.g. in a mixer. Whilst this technique is perfectly acceptable in an industrial or a laboratory environment where it is not essential to deliver the final product in real time such preparations are not acceptable in a grocery environment where food products are prepared and delivered to the customer in real-time.

Food products such as pizzas come in many different types and is largely dependent on the type of toppings or ingredients added to a pizza base. Such toppings or ingredients of pizzas vary and is largely chosen by a customer. For example, a customer may have a certain preference to one or more types of toppings. This may be due to allergy or taste preference. The same principle applies to fillings in a sandwich. In view of the different customer preferences, there has been a trend in grocery stores or bakers for customers to have the freedom to choose their own topping or ingredients when building a food product such as a pizza.

In a fast-moving environment, such as a delicatessen where the grocery or food store needs to attend to a large number of customers, the store, in particular the chef, must ensure that the correct amount of ingredients is added each time a food product such as a pizza is made to prevent wastage and to ensure that the food product provides the correct taste. Too much of one or more ingredients will have an impact not only on taste but lead to wastage. Accumulated over a large number of food products will result in loss of revenue for the store. Any attempt to remove the excess of the one or more ingredients can be problematic as the ingredients may be contaminated with other ingredients in the mix to the extent that the store will either have to absorb the costs of the excess ingredients or discard the whole of the food product. Equally, too little of one or more ingredients will not only affect the taste of the food product but not be legally compliant in terms of overselling the food product. This is particularly the case of toppings that are added to a pizza base. Ingredients such as cheese, tomato and more expensive ingredients such as prawns, meat items, if added in excess over time will hurt a business's revenue. Additionally, any excess ingredients added to a mixture cannot be returned back since it will have become contaminated with the other ingredients in the mixture. More care is thus required when adding ingredients to make sure that the correct amount of ingredient is added each time, e.g. correct amount of toppings, to a pizza base. However, this is conflicted by the need of the chef to cater for a large number of customers in a store, i.e. to prevent customers waiting too long for their food product. A balance must be made between adopting more care to add the correct quantity of ingredient to a food product and to provide a quick turnaround time in delivering the final food product to the customer.

Grocery stores such as supermarkets have attempted to mitigate this problem by using receptacles that hold a fixed quantity of ingredient each time a user such as the chef uses the receptacle to measure the quantity of ingredient. In the case of building a pizza, a receptacle is used to measure the correct quantity of cheese, tomato and other selected ingredients or toppings added to a pizza base. However, the problem with a such a method is that a number of different receptacles are needed for each type of ingredient, e.g. due to the differing shape, side or density of the food product (cheese versus mushrooms). Traditionally, a single receptacle such as a scoop is used and the chef, through experience, uses his or her judgement to measure the quantity of ingredients needed in a food product. In a majority of cases, this leads to underselling some of the ingredients in order to please the customer as well as to prevent a legal backlash in terms of not meeting the required weight targets. Over time, such inaccuracies in correctly measuring the right quantities of ingredients will lead to underselling the food product and a loss of revenue.

A device or technique is required that allows a user such as a chef, in a grocery store to add the correct quantity of different ingredients in situ and in real time in making a food product such as toppings on a pizza base or fillings in a sandwich.

In some fast-moving environments, the chef must prepare a large number of food products in a short amount of time. When a chef is busy, it is not an efficient nor convenient use of the chef's time to prepare each food product by ensuring that the correct quantities of each ingredient are added to the food product.

Therefore, a device or technique is required that allows a user, such as a chef in a grocery store, to prepare a food product according to the correct total quantity in situ and in real time.

SUMMARY OF THE INVENTION

The present invention addresses the above problem by providing a control system for controlling the quantities of items of a product comprising: a weighing scale; a memory storage device comprising data representing a target associated with the weight of at least one item; and a processor in communication with the weighing scale and the memory storage device;

said processor configured to output a sensory indicator corresponding to the weight of at least one of the items placed on the weighing scale, said sensory indicator provides a different sensory indication when the weight of at least one of item placed on the weighing scale is above, below or between the target.

Optionally, the memory storage device comprises data of a first target associated with a weight of at least one item and data of a second target associated with a weight of a final product.

The processor may be configured to selectively operate in one of a plurality of weighing modes. Optionally, in a first weighing mode, the at least one item is a component of the final product, and the first mode comprises determining compliance of the weight of the at least one item placed on the weighing scale with the first target. Optionally, a second mode comprises determining compliance of a weight of a plurality of items placed on the weighing scale to form the final product with the second target.

When the processor is configured to selectively operate in one of a plurality of weighing modes, said sensory indicator may provide a different sensory indication when the weight of at least one of item placed on the weighing scale is above, below or between the respective first or second target.

Optionally, the processor is configured to selectively operate in one of the plurality of weighing modes in dependence on at least one of an identified user of the weighing scale and one or more time periods.

The control system may comprise a user input device configured to receive an input indicative of a selection of one of the plurality of weighing modes.

Optionally, the processor is configured to output a user interface via an output device, wherein the user interface comprises an indication of at least one of the weighing modes for selection by a user.

In some embodiments, the processor is configured to determine compliance of a weight of each of a plurality of items to the respective first target of each item in the first weighing mode.

The following optional features may be implemented in the case when the processor of the control system is configured to selectively operate in one of a plurality of weighing modes or in the case when processor of the control is not configured to selectively operate in one of a plurality of weighing modes.

The sensory indicator may be any one of a visual indicator, an audible indicator and/or a haptic indicator. The different sensory indication can be any one of (i) a visual change in colour in a visual indicator and/or (ii) an audible change in frequency and/or amplitude in an audible indicator.

Optionally, the visual indicator is a display screen comprising a marker on a visual scale corresponding to the weight of the at least one item placed on the weighing scale. The marker may be an index or graduation which represents a proportion of the weight of the item placed on the weighing scale.

The visual scale may be a non-linear visual scale such that the region corresponding to between the predetermined lower and upper threshold is disproportionately larger than the region corresponding to the weight outside of the predetermined lower and upper threshold. The visual scale may be a non-linear visual scale such that the region corresponding to between the predetermined lower and upper threshold is disproportionately larger than the region corresponding to the weight outside of the predetermined lower and upper threshold.

Optionally, the target comprises a predetermined upper and lower weight threshold such that the sensory indicator provides a different sensory indication when the weight of at least one of the items placed on the weighing scale is between the predetermined lower and upper threshold weight limit to when the weight is outside of the predetermined lower and upper threshold limit. Alternatively, in another option, the target comprises a target weight such that the sensory indicator provides a different sensory indication when the weight of at least one item placed on the weighing scale is above the target weight to when the weight is below the target weight. The target may refer to both the first target and the second target.

The predetermined lower and upper threshold limits of the at least one item may be a predetermined proportion of the target weight of the at least one item on the weighing scale.

Optionally, the storage device stores data associated with the weight of the at least one item in one or more products.

The processor may further be configured to correlate the data associated with the weight of the at least one item in one or more products to one or more users, and this data may be stored on the storage memory device. The processor may be configured to correlate the data associated with the weight of the final product to one or more users, and this data may be stored on the storage memory device. The advantage of this is that the food products can be traced to a particular user. This help a grocer to assess those users that have adhered to the correct recipe in a food product and those, that have not.

Optionally, the processor may be configured to output to the sensory indicator a sequence in which two or more of the items are to be added to the weighing scale.

The present invention also addressed the aforementioned problem by a method of controlling the quantities of items of a product by a control system comprising the steps of: (i) placing at least one item on a weighing scale; (ii) providing a first sensory indicator to a user when the weight of at least one item is below or between a target associate with the weight of at least one item; (iii) providing a second sensory indicator to the user when the weight of at least one item is above or outside of the target.

The method may comprise ii) storing, on a memory storage device, data of a first target associated with a weight of at least one item and data of a second target associated with a weight of a final product.

The method may comprise iii) selectively operating in one of a plurality of weighing modes. Optionally, in a first weighing mode, the at least one item is a component of the final product, and the first mode comprises determining compliance of the weight of the at least one item placed on the weighing scale with the first target. Optionally, a second mode comprises determining compliance of the weight of a plurality of items placed on the weighing scale to form the final product with the second target.

When the processor is configured to selectively operate in one of a plurality of weighing modes, the method may comprise providing a first sensory indicator to a user when the weight of at least one item is below or between the respective first or second target associated with the weight of at least one item. Optionally, the method comprises providing a second sensory indicator to the user when the weight of at least one item is above or outside of the respective first or second target.

Optionally, the method comprises selectively operating in one of the plurality of weighing modes in dependence on at least one of an identified user of the weighing scale and one or more time periods.

In some options, the method may comprise receiving, via a user input device, an input indicative of a selection of one of the plurality of weighing modes The method may comprise outputting a user interface via an output device, wherein the user interface comprises an indication of at least one of the weighing modes for selection by a user.

Optionally, the method comprises determining compliance of a weight of each of a plurality of items to the respective first target of each item in the first weighing mode.

The following optional features may be implemented in the case when the method comprises selectively operating in one of a plurality of weighing modes or in the case when the method does not comprise selectively operating in one of a plurality of weighing modes. In some options, the target comprises a predetermined upper and lower weight threshold and further comprises the steps of: (i) providing a first sensory indicator to a user when the weight of at least one item is between the predetermined upper and lower weight threshold; (ii) providing a second sensory indicator to the user when the weight of at least one item is outside of the predetermined upper and lower weight threshold. In another option, the target comprises a target weight and further comprises the steps of: (i) providing a first sensory indicator to a user when the weight of at least one item is below the target weight; (ii) providing a second sensory indicator to the user when the weight of at least one item is above the target weight. The target may refer to both the first target and the second target.

The method may comprise storing, on the memory storage device, data associated with at least one of the weight of the at least one item in one or more products and the weight of the final product.

Optionally, the method comprises correlating the data associated with at least one of the weight of the at least one item in one or more products and the weight of the final product to one or more users or operators.

In the case that there are multiple items, the method may further comprise the step of repeatedly adding the at least one item on the weighing scale until the first sensory indicator is provided.

DETAILED DESCRIPTION

The present invention relates to a control system for controlling the quantities of items of a product, e.g. a food product. This is especially useful where the precise quantities of each item are imperative to the quality of the product, e.g. the quantity of each ingredient to form a pizza or the precise quantity of a final product i.e. the produced (finished) pizza. In the example of a food product, the quantities can be measured using a weighing scale. For example, in the scenario of making a pizza, the base is expected to weigh a certain amount, and given this weight, the amount of cheese or tomato sauce or other ingredient(s) can largely impact the quality of the final cooked product. Therefore, many chefs are very particular about using precisely the correct amount of each ingredient in their recipes.

There is a predetermined amount of each ingredient that is regarded as ideal in a food, e.g. a margherita pizza may ideally contain a base that weighs 500 g, 100 g of tomato sauce and 100 g of mozzarella. Each of these predetermined target weights may have a tolerance, i.e. a predetermined upper and lower threshold. The tolerance may be a proportion of the predetermined target weight, e.g. a fixed percentage of the predetermined target weight such as 1% or 2% or 5% or 10% or 20%. Equally, excessive use of ingredients can have an impact on a grocer's business as products are repeatedly undersold. The predetermined target weight of each ingredient may be a first target. Therefore, each ingredient may have a different first target.

When a chef is required to prepare large amounts of food product in a short amount of time, the chef may not have time to weigh each ingredient individually. Thus, it is useful that a precise quantity of the food product in its entirety can be measured using a weighing scale. For example, in the scenario of making a pizza, the total weight of the pizza is expected to weigh a certain amount. Therefore, many chefs working at busy times prefer to prepare a food product with a correct final weight, rather than spend time weighing precisely the correct amount of each ingredient in their recipes.

There is a predetermined amount of a final product that is regarded as ideal, e.g. a margherita pizza may ideally weigh 700 g in total and a pepperoni pizza 780 g. The predetermined final target weight may have a tolerance, i.e. a predetermined upper and lower threshold. The tolerance may be a proportion of the predetermined final target weight, e.g. a fixed percentage of the predetermined final target weight such as ±1% or 2% or 5% or 10% or 20%. Equally, excessive preparation of overweight food products can have an impact on a grocer's business as products are repeatedly undersold. The predetermined final target weight may be a second target.

As such, the present invention relates to a control system for controlling the quantities of items of a product that selectively operates in one of a plurality of weighing modes. The plurality of weighing modes may include a first weighing mode and a second weighing mode.

The description refers to "at least one item" throughout. It will be appreciated that in the first mode, the expression "at least one item" is intended to refer to each component item forming a final product, for example each food ingredient of a food product (e.g. base, cheese and tomato sauce individually). Conversely, it will be appreciated that in the second mode, the expression "at least one item" is intended to refer to a plurality of items forming a final product, for example the ingredients of a food product collectively.

In the first mode, a compliance of a weight of the at least one item placed on the weighing scale with the first target is determined. For example, the quantity of cheese placed on the weighing scale is measured. The measured weight is compared to the value of the first target associated with the predetermined target weight of cheese to determine compliance of the weight of the at least one item with the first target. The first mode may be called a "compliance mode".

In the second mode, a compliance of a weight of a plurality of items forming the final product, i.e. the total weight of the final product, placed on the weighing scale with the second target is determined. For example, the quantity of an entire pizza (e.g. base, cheese and tomato sauce collectively) is measured. The measured weight of the final product is compared to the value of the second target associated with the predetermined final target weight to determine compliance of the weight of the final product with the second target. The second mode may be called a "production mode".

In some cases, the present invention may be used to train a new user, or a user wishing to undertake periodic training, with the first mode acting as a "training mode". Using the first mode, a new user can become familiar with a look and/or feel of the predetermined ideal amount of each component item which forms the final product. Once the user has experience preparing final products using the first mode, the user may use the present invention in the second mode. It will be appreciated that the new user will prepare the final product with greater accuracy using the experience from a period of time with the scale operating in the first mode.

The following description applies to both the first mode of operation and the second mode of operation. References made in the description to "target weight" may refer to the "predetermined target weight" or the "predetermined final target weight" in dependence on the weighing mode in operation. References made in the description to "target" may refer to the "first target" or the "second target" in dependence on the weighing mode in operation.

In some examples, the control system may not have the function to selectively operate in one of plurality of weighing modes and may operate in only the first mode or only the second mode.

Figure 1:
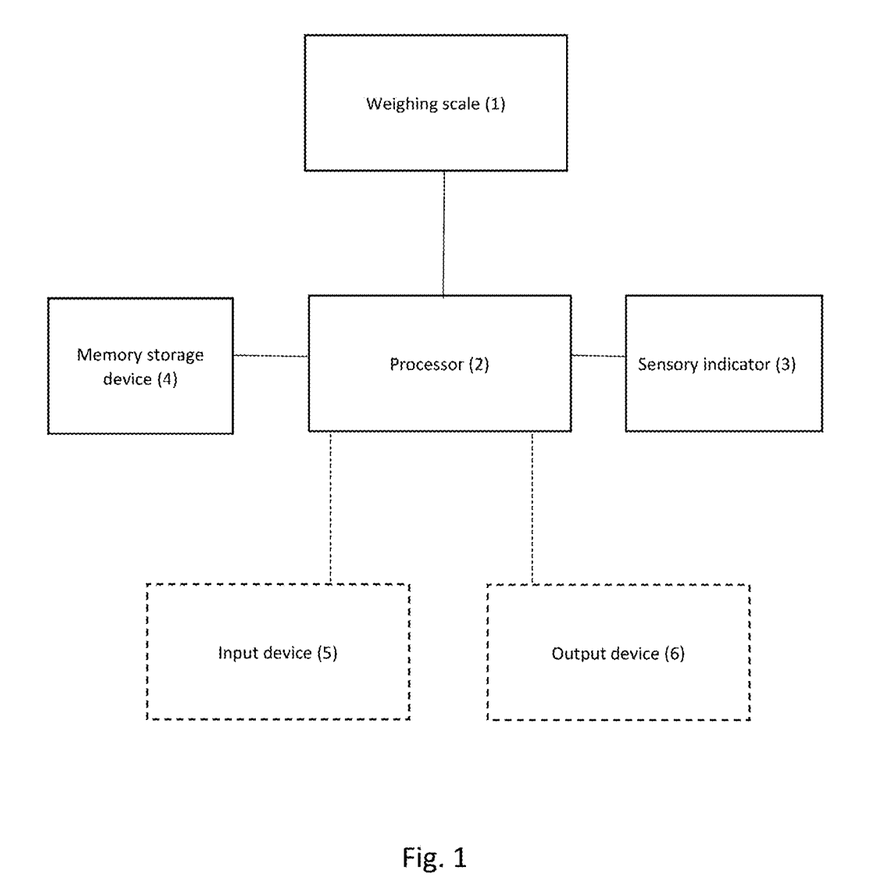
FIG. 1: A schematic of the apparatus.
Figure 2:
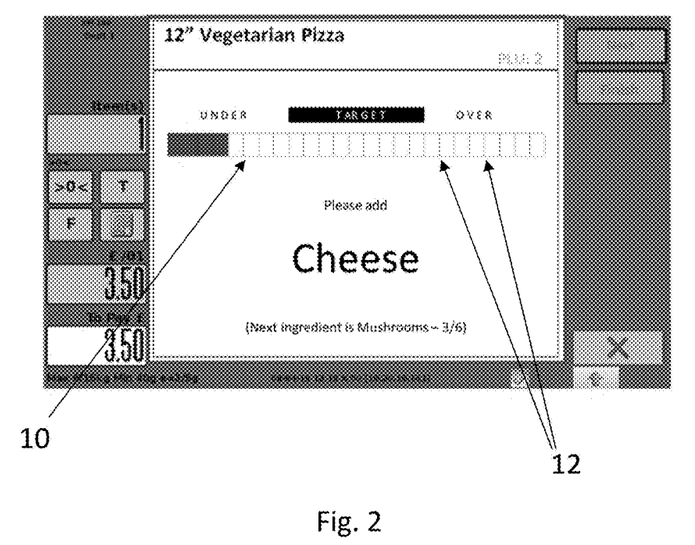
FIGS. 2-6: A schematic of the operation of the visual indicator embodiment.

Reference is now made to FIG. 1. The present invention addresses the problem of kitchen disasters caused by a lack of ingredient control by a system comprising a processor in communication with a weighing scale 1. The processor 2 is also in communication with a memory storage device 4, wherein the memory storage device 4 stores data related to a target of at least one item associated with the weight of said at least one item. The data could be stored as a list of items with its corresponding target in a look-up table.

As discussed above, for the purpose of the present invention, when the processor operates in the first mode, the at least one item can be a food item such as an ingredient and when the processor operates in the second mode, the at least one item can be a final food product. For example, in the case where the food product is a pizza, in the first mode, the at least one item is a topping that is added to a pizza base and in the second mode, the at least one item is the entire, finished, pizza. The target can represent a range of weights or a target weight of an item that is considered acceptable in a food product. Further detail of the different options of the target when measuring the weight of an item in a food product is discussed below. The processor 2 and the memory storage device 4 as shown in FIG. 1 can be integrated within the weighing balance 1 or provided as separate components.

As will be explained, embodiments of the present invention may selectively operate in one of a plurality of modes according to one or more criteria. The one or more criteria may include a current time and/or day, in dependence on a user input, in dependence on a user, as will be explained.

The processor 2 may be configured to selectively operate in one of the plurality of weighing modes in dependence on one or more time periods. The processor may selectively operate in one of the plurality of weighing modes according to a given time period or a rate of food product production. For example, the processor may automatically operate in the first mode every week day and switch to operate in the second mode at weekend days. Similarly, the processor may automatically operate in the first mode between the hours of 10 pm to 9 am each day and switch to operate in the second mode between the hours of 9 am and 10 pm each day. The memory storage device 4 may store data indicating the time periods and the corresponding weighing mode in which the processor is to operate in during that time period.

The processor may operate in the first mode as a default and switch to operate in the second mode when the rate of food product production is larger than a predetermined value (e.g. the processor determines that the rate of food products produced every 5 minutes is greater than or equal to 5). Similarly, the processor may operate in the second mode as a default and switch to operate in the first mode when the rate of food product production is smaller than a predetermined value (e.g. the processor determines that the rate of food products produced every 5 minutes is less than 5). In these cases, the processor may receive time information from an internal timer or clock.

The control system may comprise a user input device 5 in communication with the processor 2. The user input device 5 may be configured to receive an input indicative of the selection of the weighing mode. The user input may be in the form of a physical input, audible input, user gesture in some embodiments. The input device may be a user input device, such as a keyboard, mouse, microphone, button, touchpad or any other device configured to receive an input. For example, a user may be able to use speech and/or activate a switch or other control as the input indicative of the selection of the weighing mode.

The processor 2 may be configured to output a user interface via an output device 6. The user interface comprises an indication of at least one of the weighing modes for selection by a user. The output device 6 may be a display screen, speaker, or any other device configured to provide an output. The input device 5 and the output device 6 may be combined into an I/O device, such as a touchscreen. For example, the output device 6 may output a first button corresponding to the first mode and a second button corresponding to the second mode on a user interface of a touchscreen. The user may provide an input by tapping the first button to select the first mode. The processor 2 may receive the input, via the I/O device, and operate in the first mode in accordance with the input.

When the processor 2 operates in the first weighing mode, it may be configured to determine compliance of a weight of each of a plurality of items to the respective first target of each item. Using the example of a chef preparing a margherita pizza, the processor may determine compliance of a weight of base to the first target associated with the weight of base, then determine compliance of a weight of tomato sauce to the first target associated with tomato sauce and lastly determine compliance of a weight of cheese to the first target associated with the weight of cheese.

The processor 2 is configured to output a sensory indicator 3 corresponding to the weight of at least one of the items placed on the weighing scale 1. This sensory indicator can be any of a visual indicator (e.g. so as to provide a visual change in colour), an audible indicator (e.g. so as to provide an audible change in frequency and/amplitude), and/or a haptic indicator. For example, the sensory indicator 3 can be selected to cater for users that are visually impaired or deaf. The sensory indicator 3 provides a different sensory indication when the weight of an item placed on the weighing scale 1 is above, below or between the target. There are different options in determining whether an item or an ingredient in a food product meets a required target weight.

In a first option, the target comprises a predetermined upper and lower weight threshold such that the sensory indicator provides a different sensory indication when the weight of at least one of the items placed on the weighing scale is between the predetermined lower and upper threshold weight limit to when the weight is outside of the predetermined lower and upper threshold limit. The predetermined upper and lower weight threshold represent the upper and lower control limits to which the weight of an item would need to fall within in order to be considered acceptable, i.e. outside of an error range. The predetermined upper and lower weight threshold can be determined as a percentage of the target weight of said item, e.g. 1% or 2% or 5% or 10% or 20% of the target weight. The advantage of this is to provide an indication of whether the quantity of the item added to the scale to form the product is within the predetermined tolerances.

In a second option, the target is an actual target weight such that the sensory indicator provides a different sensory indication when the weight of at least one items placed on the weighing scale is above the target weight to when the weight is below the target weight.

FIGS. 2 to 6 shows an example where the sensory indicator is a display on a visual scale. As shown in FIGS. 2-6, the visual indicator is a display screen comprising a visual scale 10 corresponding to the weight of the item placed on the weighing scale. The scale is indexed or graduated whereby each index or graduation 12 represents a proportion of the weight of the item placed on the weighing scale. In the particular example shown in FIGS. 2 to 6, the item or ingredient is cheese. The scale is separated into a lower control limit referenced "under" in FIG. 2 and upper control limit referenced "upper" in FIG. 2. The lower control limit and the upper control limit is spread across a number of indexes or graduations across the scale and represent the range of the lower control limit and the upper control limit that the weight of the item must not fall within. In between the lower control limit and the upper control limit is the target range or acceptable range. The range of the lower control limit, the upper control limit and the acceptable zone is dependent on the accuracy by which an item can be measured which in turn is dependent on the divisibility of an item or how finely chopped or diced the item. For example, the weight of grated cheese can be easily controlled to a target weight but the weight of broadly chopped vegetables can be problematic without the need for further chopping. The range of the upper, lower or target zone is scaled to cater for the differently sized or chopped items.

Figure 3:
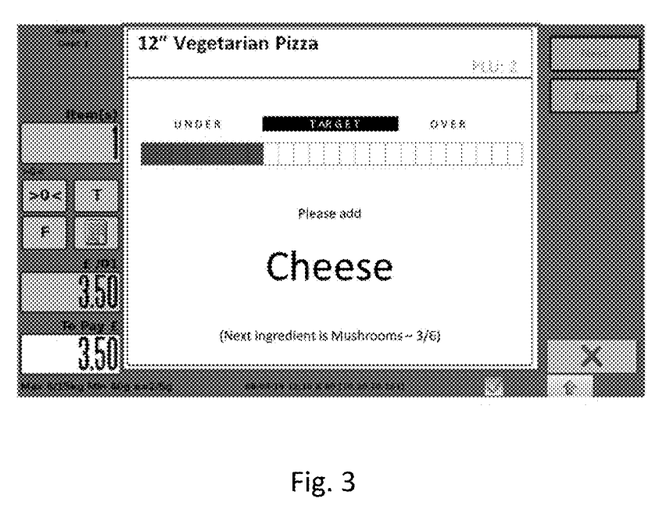
Figure 4:
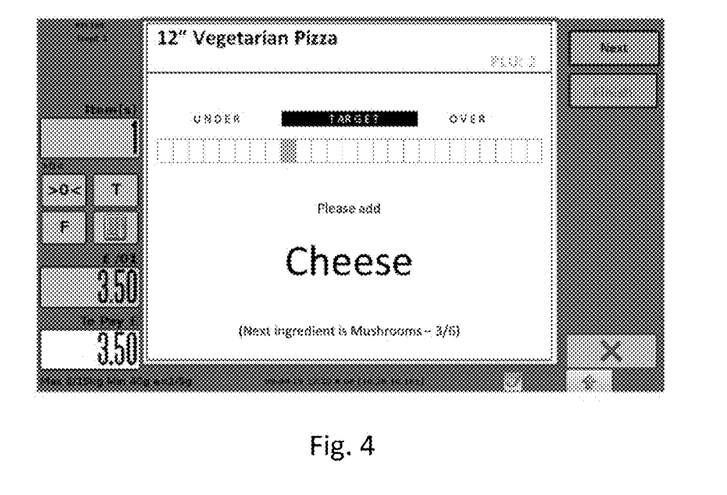
Figure 5:
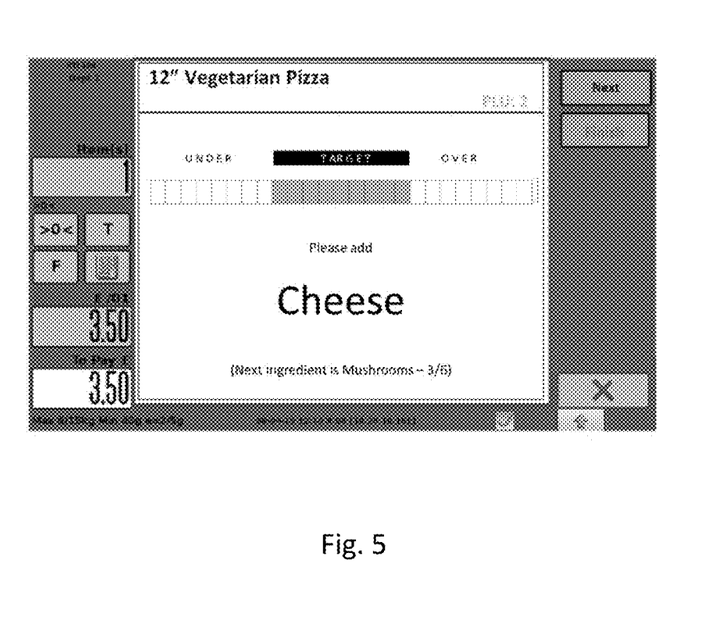
Figure 6:
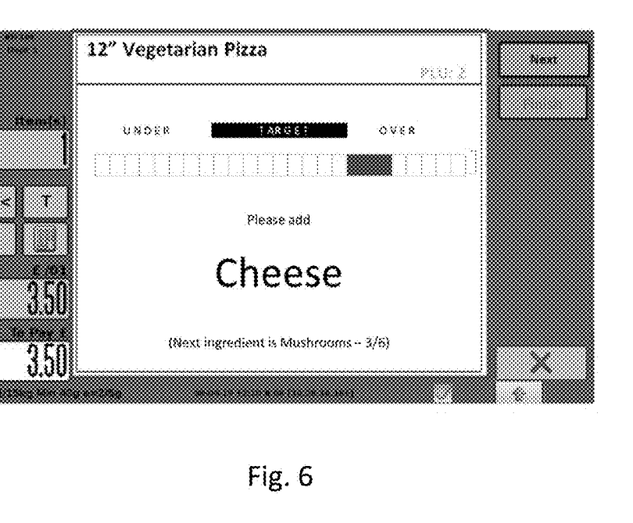

As more cheese is added to the weighing balance more of the graduations or indexes are coloured. In the particular example shown in FIGS. 2 to 6, weights that are outside of the target zone appear red and those weights that fall within the target zone appear green. As can be seen in FIG. 3 as more of the item, in this case cheese, is added to the weighing balance, more of the indexes or graduation are coloured in red until the weight of the item falls with the target zone whereupon the indexes or graduations appear with a different colour, e.g. green (see FIG. 4). At this point the weight of the item has reached the acceptable range within the target zone. The colour of the indexes or graduations remain green as further weight of the item, e.g. cheese, is added to the weighing balance (see FIG. 5). When too much of one item is added to the weighing balance, the item on the weighing balance is overweight and the colour of the index or graduations revert back to the same colour as to when the weight of the item is under weight, e.g. red (see FIG. 6), indicating that this is not within the acceptable region. The scale provides a real time and easily visible indication to a user as to whether the quantity or weight of an item falls outside or within the target zone for adding to a food product.

When the processor 2 operates in the first mode and/or the second mode, an indication of the minimum required weight requirement may be indicated on the visual scale. The minimum required weight requirement may be a minimum weight to be legally compliant in terms of overselling the food product, or a minimum weight required by an organisation.

Every time a new ingredient is added, the weighing scales are reset (tared), and the subsequent ingredient is added and the display screen now displays a scale indicating whether the quantity added is within or outside of the predetermined upper and lower thresholds.

The visual scale of the visual indicator may be a non-linear visual scale such that the region corresponding to between the target is disproportionately larger than the region corresponding to outside of the target. This is to place an emphasis on the region of interest (e.g. between the predetermined lower and upper thresholds). However, the present invention is not limited to the sensory indicator being a visual indication on a display screen and can provide another sensory indicator to indicate the user or operator whether the weight of an item falls within or outside of a defined range. For example, for the visually impaired, the sensory indicator may provide different audible sounds as to whether the weight of the item falls within a target zone or falls outside of the target zone. Other sensory indicators include providing a different haptic feedback when the operator or user places items on the weighing scale. The real time feedback from the sensory indicator allows the operator or user to make the necessary adjustments to the quantity and therefore, weight of an item until the weight of the item falls within the target range.

Figure 7A:
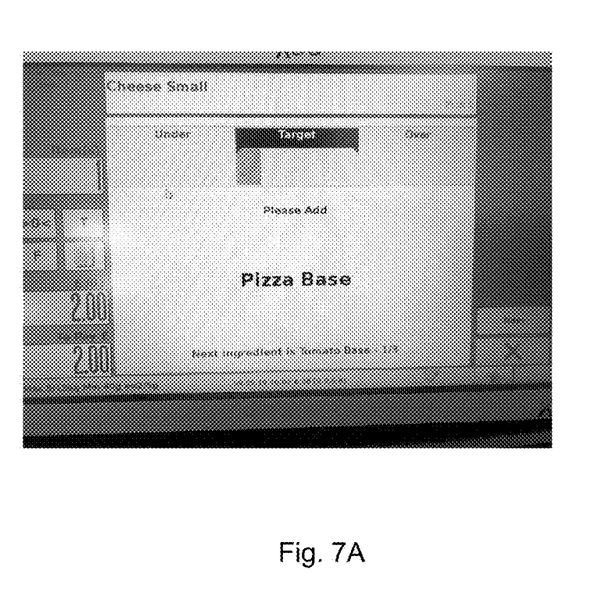
FIGS. 7A-7C: A schematic showing the steps involved in the operation of the present invention.
Figure 7B:
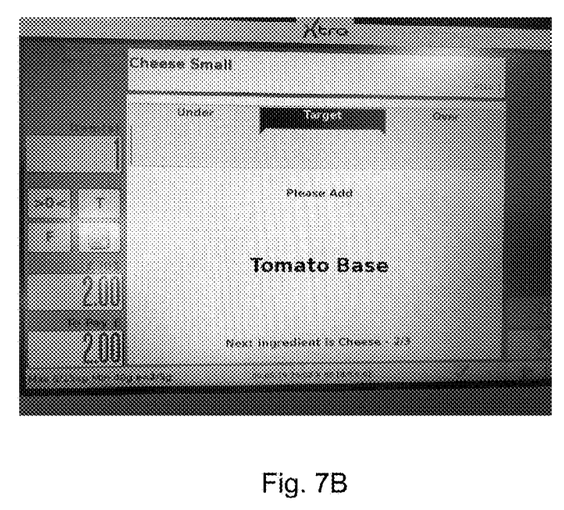
Figure 7C:
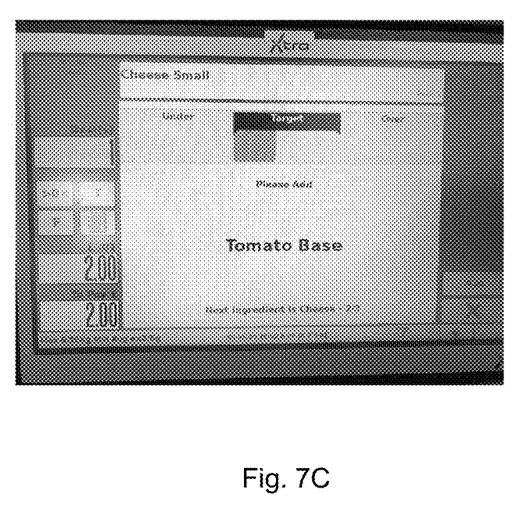

The processor may be configured to output to the sensory indicator a sequence in which two or more items are to be added to the weighing scale in separate steps. In other words, two or more ingredients of a food product can be stored in a memory storage device 4, the data of which is accessible by the processor 2. As a food product is selected by an operator or user, the processor retrieves the two or more ingredients of the food product from the storage device 4. The number of items is dependent on the number of ingredients in a food product. For example, in the case with the food product is a pizza, the number of items is the number of toppings selected by a customer. FIGS. 7A-7C. shows the stages in controlling the quantity of toppings on a pizza base including the weight of the pizza base itself. For example, in the scenario of preparing a margherita pizza, the first step (FIG. 7A) of the sequence is to add the first item (the pizza base) to the scales until ideally the weight falls between the predetermined upper and lower weight thresholds for a base, the second step (FIG. 7B) of the sequence is to add the second item (the tomato sauce) to the base until (ideally) the weight falls between the predetermined upper and lower thresholds for tomato sauce (as shown in FIG. 7C), and the third and final step of the sequence is to add the third item (the cheese) to the first two ingredients until (ideally) the weight falls between the predetermined upper and lower thresholds for cheese. Between each step, the weighing scale is tared (i.e. reset to allow for the subsequent item to be weighed independently of the previous item(s)). In all of the sequences, the real time feedback allows an operator or user to prepare the quantity of each of the toppings with a greater degree of accuracy using the visual indicators on the scale. The above example is of a three-step sequence, but the sequence can be of any number of steps (i.e. two or more steps) which is dependent on the number of items or ingredients.

In order to proceed to the next step, it may not be necessary for the item to weigh between the predetermined upper and lower thresholds. This is because if the user that is placing the item on the scale puts on too much, e.g. too much cheese onto a pizza, the cheese may now be contaminated by virtue of making contact with the tomato sauce so the user cannot remove the excess cheese without it being wasted. Preferably, a user can provide an input (via any known means, e.g. a button on the scale, a button on a screen, voice command etc.) to bypass the first step by manually indicating that the current step is complete and to proceed to the subsequent step (or complete the final step). In all case, the processor records the weight of each of the items used for different food products made during a period of time. This will help, the store (grocer) or operator to have an understanding of the usage of ingredients or items used over a period of time with the ultimate aim of providing a stock take of the ingredients or items in the store and whether one or more items or ingredients would need to be replenished.

Figure 8:
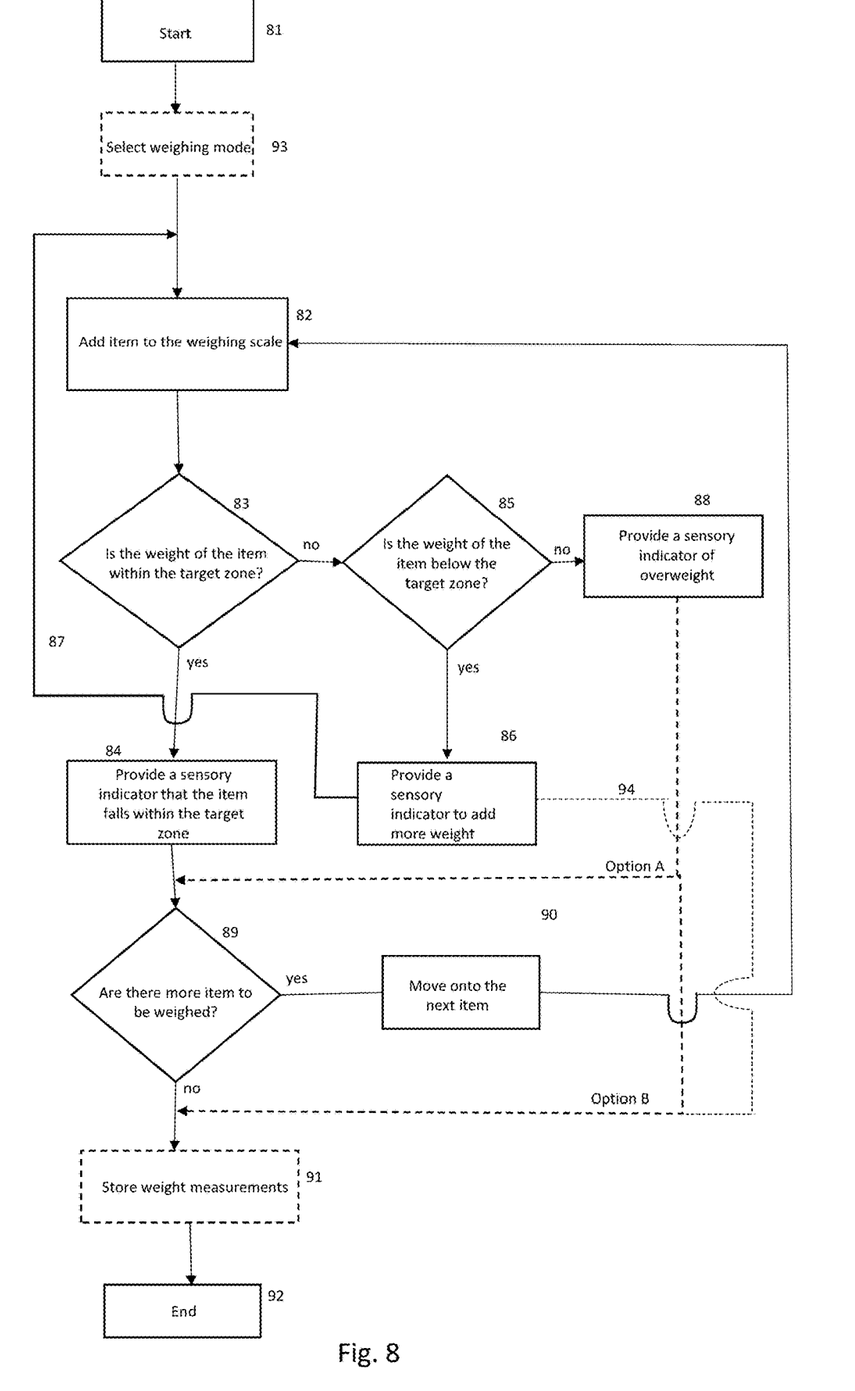
FIG. 8: A flow diagram showing one way of operating the present invention.

FIG. 8 shows an example of a flow chart for the first mode and/or the second mode, whereby the target is the target weight such that the sensory indicator provides a different sensory indication when the weight of at least one items placed on the weighing scale is above the target weight to when the weight is below the target weight. The flowchart shown in FIG. 8 can be applied to the option whereby the target comprises a predetermined upper and lower weight threshold such that the sensory indicator provides a different sensory indication when the weight of at least one of the items placed on the weighing scale is between the predetermined lower and upper threshold weight limit to when the weight is outside of the predetermined lower and upper threshold limit by analogy. The first step (82) is to add an item to the weighing scale. The processor determines (83) as to whether the measured weight at the weighing scale is within the target zone. If the weight of the item placed on the weighing scale is within the target zone, the processor provides a sensory indicator (84) to the user or operator indicating the same, i.e. the weight of the item is within the target zone. The processor will then proceed onto the next item or ingredient in the food product 89. If, however, the weight is not within the target zone, the processor then determines whether the weight is below the target zone (85). If the weight of the item on the weighing balance is below the target zone, then the processor provides a sensory indicator to the user indicating the same, i.e. the weight of the item is below the target zone. Knowing that the weight of the item placed on the weighing balance is below the target zone, a feedback loop then returns to the beginning of the flowchart 82 to incrementally add more of the item to the weighing scale. In the first mode and/or the second mode, an indication of the minimum required weight requirement may be indicated on the visual scale at a position corresponding to a value of the minimum requirement weight requirement.

If the weight of the item is not within the target zone and not below the target zone, then the processor will go to the default position to provide a sensory indicator that the weight of the item on the weighing balance is overweight 88. It would be implicit that if the weight is not within the target zone and not below the target zone, then the other foreseeable option is that the weight is above the target zone. The processor is then set to the default position of being overweight. When the item placed on the weighing scale is measured as being overweight, the item on the weighing scale may be contaminated with other items or ingredients on the weighing scale. As a result, there are two options that the processor may proceed—these are shown in FIG. 8 as dashed lines. Option A, the processor will proceed straight to the next item or ingredient in the food product 89. If the excess item or ingredient will not greatly affect the quality or taste of the food product, then the processor will proceed to the next item or ingredient in the food product. Alternatively, in option B, the processor will proceed to end giving an indication to stop the processing. This is where for example, the excess item or ingredient will have a detrimental impact on the taste or quality of the final food product. As a result, the product will be discarded.

Optionally, the processor will store the weights of the items for each product made. This allows the processor to provide a history of items weighed on the weighing balance and their corresponding weight for each food product made. This is shown as a dashed box 91 in FIG. 8.

In the second mode, when the weight of the item on the weighing balance is below the target zone, the processor may provide the sensory indicator to the user indicating that the same. However, the processor may not follow the feedback loop illustrated in FIG. 8 by the arrow of step 87. Instead, the processor may follow the arrow of step 94 and move straight onto step 92, or 91 if required.

However, in the second mode, if the weight of the item on the weighing balance is below the minimum required weight requirement, the processor provides a sensory indicator to the user indicating the same, i.e. the weight of the item is below the minimum required weight requirement. Knowing that the weight of the item placed on the weighing balance is below the minimum required weight requirement, a feedback loop then returns to the beginning of the flowchart 82 to incrementally add more of the item to the weighing scale FIG. 8 also illustrates step 93 which is performed when the processor selectively operates in one of a plurality of weighing modes. Step 93 is illustrated as occurring at the start of the method illustrated in FIG. 8, however step 93 may occur in between step 82 and step 83 instead.

In step 93, a weighing mode from a plurality of weighing modes is selected. Step 93 may comprise selectively operating in one of the plurality of weighing modes in dependence on one or more time periods. For example, the processor may selectively operate in one of a plurality of weighing modes in dependence on a given time period or a rate of food product production as discussed earlier.

Step 93 may also comprise selectively operating in one of the plurality of weighing modes independence on an identified user. The processor may be configured to identify a user who is operating the system. Each time a different user uses the system, the processor asks the users to enter his/her security information. For example, the processor may ask for a user input of credentials, e.g. name, employee number etc and/or a private password. The control system may also comprise an additional device capable of receiving the input of the security information. For example, the control system may comprise a biometric scanner for receiving biometric information as the security information and/or a wireless reading device such as an NFC reader for receiving NFC data as the security information, although other wireless communication technologies may be used, particularly those having-in-built security provisions. The user's security information is stored in the memory storage device.

The processor may be configured to associate specific processor settings with a user. The memory storage device may store the specific processor setting associated with each user. For example, the processor may correlate a user with a weighing mode (e.g head chef may always use the second mode and a trainee chef may always use the first mode). The processor may load the specific processor settings when the user is identified.

Step 93 may comprise receiving, via a user input device, an input indicative of the selection of the weighing mode. Furthermore, step 93 may comprise outputting a user interface via an output device, wherein the user interface comprises an indication of at least one of the weighing modes for selection by a user. The processor may operate in either the first mode or the second mode in dependence on the input provided by the user. The processing steps are not restricted to the steps shown in FIG. 8 and other processing steps are permissible in the present in order to establish whether the measured weight of the item on the weighing balance is within the target zone. For example, as the item is added incrementally to the weighing balance, the processor determines whether the whether the weight of the item on the weighing balance is above a minimum target threshold. If the weight of the item is above a minimum target threshold, then the processor signals the sensory indicator to indicate a corresponding sensory indication, e.g. a green light. If the weight of the item is below the minimum target threshold, then the processor signals the sensory indicator to indicate a corresponding sensory indication, e.g. a red light. As a result, the processor waits for the user to add more of the item to the weighing balance until the weight of the item increases above the minimum target threshold. If too much of the item is added to the weighing balance and the weight of the item goes beyond a maximum target threshold, then the processor signals the sensory indicator to indicate a corresponding sensory indicator, e.g. a red light, that too much of the item has been added to the weighing balance. The whole process is repeated for different items or ingredients in a given food product.

The target, target weight, predetermined upper and lower threshold weights and/or the sequence may be stored on a memory storage device in communication with the processor. The memory storage device may be local (a hard drive) or remote (a server) to the processor.

The processor may also be configured to correlate the measured weight of an item with a user (e.g. the chef), and communicate this data to the memory storage device. This is to assess whether the chef has correctly formed the final product. Data associated with the weight of each of the items for a particular product can be stored on a memory storage device. The data associated with the weight of each of the items for a particular product can be stored for all of the food products made during a particular time period, e.g. at the end of day or week. In addition to storing data associated with the weights of items, the data associated with the weight of items for a food product can be correlated to a particular user of the system. The processor can then correlate the stored weights of items of food products made during a period of time to a particular user. This helps the grocery department determine users that have not adhered to the correct recipe of a food product with the effect of generating food waste. This correlation can be presented as a graphical chart, e.g. bar chart. For example, the graphical chart can display a list of operators during a period of time and correlate the list of operators to the food products made during that period of time including the weight of items or ingredients used for making the food product.

Similarly, data associated with the weight of the final product may also be stored on the memory storage device. Additionally, data associated with the weight of the final product can also be correlated to a particular user of the system as described above.

The invention claimed is:

1. A control system for controlling quantities of multiple items used as components to create a final product, comprising:
    a) a weighing scale;
    b) a memory storage device comprising data of a target associated to a weight of at least one item of the multiple items; and
    c) a processor in communication with the weighing scale and the memory storage device;
    said processor configured to output a sensory indicator corresponding to the weight of the at least one item placed on the weighing scale, said sensory indicator provides a different sensory indication when the weight of the at least one item placed on the weighing scale is above, below or between the target;
    wherein the target comprises a first target and a second target, such that the memory storage device comprises data of the first target associated with the weight of the at least one item and data of the second target associated with a weight of the final product, and the processor is configured to:
        selectively operate in one of a plurality of weighing modes;
        wherein, in a first weighing mode, the processor determines compliance of the weight of the at least one item placed on the weighing scale with the first target, and
        wherein, in a second weighing mode, the processor determines compliance of the weight of the multiple items placed on the weighing scale, to form the final product, with the second target.

2. The control system of claim 1, wherein the processor is configured to, at least one of:
    selectively operate in one of the plurality of weighing modes in dependence on at least one of an identified user of the weighing scale and one or more time periods, and
    determine compliance of a weight of each of the multiple items to a respective first target of each of the multiple items in the first weighing mode.

3. The control system of claim 1, comprising a user input device configured to receive an input indicative of a selection of one of the plurality of weighing modes.

4. The control system of claim 1, wherein the processor is configured to output a user interface via an output device, wherein the user interface comprises an indication of at least one of the weighing modes for selection by a user.

5. The control system of claim 1, wherein the first target comprises a predetermined upper and lower weight threshold such that the sensory indicator provides a different sensory indication when the weight of the at least one item placed on the weighing scale is between the predetermined lower and upper threshold weight limit to when the weight of the at least one item is outside of the predetermined lower and upper threshold limit.

6. The control system of claim 5, wherein the sensory indicator provides a different sensory indication when the weight of the at least one item is above the predetermined upper weight threshold to when the weight of the at least one item is below the predetermined lower weight threshold.

7. The control system of claim 5, wherein the different sensory indication can be any one of (i) a visual change in colour in a visual indicator and/or (ii) an audible change in frequency and/or amplitude in an audible indicator.

8. The control system of claim 7, wherein the visual indicator is a display screen comprising a marker on a visual scale corresponding to the weight of the at least one item placed on the weighing scale.

9. The control system of claim 8, wherein the visual scale is a non-linear visual scale such that the region corresponding to between the predetermined upper and lower weight threshold is disproportionately larger than the region corresponding to outside of the predetermined upper and lower weight threshold.

10. The control system of claim 1, wherein:
    the processor is configured to output a further sensory indicator that indicates a sequence in which two or more of the items are to be added to the weighing scale.

11. The control system of any claim 1, wherein the storage device stores data associated with the weight of the at least one item for multiple final products.

12. The control system of claim 1, wherein the processor is configured to correlate the data associated with the weight of the at least one item to one or more users or operators.

13. A control system for controlling quantities of multiple items used as components to create a final product, comprising:
   a) a weighing scale;
   b) a memory storage device comprising data of a target associated to a weight of at least one item of the multiple items; and
   c) a processor in communication with the weighing scale and the memory storage device;
   said processor configured to output a sensory indicator corresponding to the weight of the at least one item placed on the weighing scale, said sensory indicator provides a different sensory indication when the weight of the at least one item placed on the weighing scale is above, below or between the target;
   wherein at least one of:
      the processor is configured to output a further sensory indicator that indicates a sequence in which two or more of the items are to be added to the weighing scale, and
      the sensory indicator is any one of a visual indicator, an audible indicator and/or a haptic indicator.

14. A control system for controlling quantities of multiple items used as components to create a final product, comprising:
   a) a weighing scale;
   b) a memory storage device comprising data of a target associated to a weight of at least one item of the multiple items; and
   c) a processor in communication with the weighing scale and the memory storage device;
   said processor configured to output a sensory indicator corresponding to the weight of the at least one item placed on the weighing scale, said sensory indicator provides a different sensory indication when the weight of the at least one item placed on the weighing scale is above, below or between the target;
   wherein the processor is configured to correlate the data associated with the weight of the at least one item in one or more final products to one or more users or operators.

* * * * *